UNITED STATES PATENT OFFICE.

WALTER S. LANDIS, OF NIAGARA FALLS, NEW YORK, ASSIGNOR TO FRANK S. WASHBURN, OF NASHVILLE, TENNESSEE.

METHOD OF MAKING SULFURIC ACID.

1,173,524.  Specification of Letters Patent.  Patented Feb. 29, 1916.

No Drawing.  Application filed February 20, 1915.  Serial No. 9,597.

*To all whom it may concern:*

Be it known that I, WALTER S. LANDIS, a citizen of the United States, residing at Niagara Falls, in the county of Niagara and State of New York, have invented certain new and useful Improvements in Methods of Making Sulfuric Acid; and I do hereby declare the following to be a full, clear, and exact description of the invention, such as will enable others skilled in the art to which it appertains to make and use the same.

This invention relates to a method of supplying oxids of sulfur with oxids of nitrogen during the process of making sulfuric acid from pyrites, and has for its object to complete the oxidation of the sulfur bearing gases in a manner more efficient and less costly than has heretofore been proposed.

With this and other objects in view the invention consists in the novel steps and combinations of steps more fully hereinafter disclosed and particularly pointed out in the claim.

In order that my invention may be more clearly understood it is said: In the manufacture of sulfuric acid from the roasting of pyrites, nitric acid has been supplied for the purpose of completing the oxidation of the sulfur by inserting pots containing sodium nitrate and sulfuric acid in the flues leading from the pyrite roasters, and thereby distilling off nitric acid into the stream of sulfur dioxid gases passing to the oxidation chambers. It is also well known that nitric acid is commonly fed to the Glover tower to distil off nitrose gases into the current of sulfur dioxid passing into the oxidation chambers. It has further been proposed to feed the nitrose gases coming from the air oxidation furnaces working on the arc process, into the current of sulfur dioxid gases coming from a pyrite furnace, for the purpose of supplying nitrose vapors to said current and thereby complete the oxidation of the sulfur dioxid $SO_2$ into sulfuric acid. But, unfortunately, nitrose gases coming from said arc furnaces only contain 1 per cent. to $1\frac{1}{2}$ per cent. of nitrogen oxids, and therefore the introduction of the necessary quantity of nitrose vapors into said sulfurous gases by this arc process, involves the use of such enormous volumes of additional gases or vapors, that the dilution of the sulfurous gases becomes so great in the oxidation chamber that a smooth and economical operation of the sulfuric acid process is no longer had. Further the manufacture of nitrose gases by the arc process is found to involve an expensive equipment involving the use of large units and considerable quantities of electrical energy and it is not flexible enough to take care of the varying demands of a sulfuric acid plant within the limits of cost of a modern, highly efficient commercially successful process of producing sulfuric acid. Nor are the first two methods mentioned above of supplying nitric acid itself to the stream of sulfurous gases, as desirable or as efficient as the method to be now disclosed for reasons which will be at once apparent to those skilled in the art.

According to my invention I introduce oxids of nitrogen having a concentration as high as 6 per cent. or higher into the stream of sulfurous gases, and thereby avoid the objections of the above prior processes, as will now be made clear. That is to say in my co-pending application No. 9596, filed February 20, 1915, and entitled "process of and apparatus for oxidizing ammonia," and No. 9595, filed February 20, 1915, and entitled Method of oxidizing ammonia, I have disclosed methods of producing catalytically nitrose gases from mixtures of ammonia and air or ammonia and oxygen enriched air, which readily and economically produce oxids of nitrogen of a concentration of 6 per cent. and above. This high concentration of the nitrose gases is attained, as disclosed in said applications by cooling the air previously to passing it through the catalyzer, or by enriching the air with oxygen up to a content of oxygen of say 30 per cent. or 40 per cent. or higher or by both enriching and cooling said air. This high concentration as stated in said applications further depends upon the regulation of the temperature of the catalyzers, after the reaction is started, and to some extent on the uniform heating of the material of the catalyzers, so as not to permit the catalyzers to fall to a temperature too low to maintain an efficient reaction on the one hand, nor to be locally heated in spots too high for an efficient reaction on the other hand.

I have found that the introduction of nitrose gases concentrated up to say 6 per cent., 8 per cent., 9 per cent., 10 per cent., or higher does not dilute the chamber gases in a sulfuric acid process to an injurious extent and therefore such gases do not interfere with the smooth and economical operation of said acid process.

Further the apparatus used for carrying out my method of operation is comparatively cheap, in that it requires only very small quantities of electrical energy, or even none at all under special conditions, and with my system of electrical control disclosed in said applications above mentioned, each unit is capable of wide variations in output, so as to meet any possible variation in the demands of a sulfuric acid plant. As a source of ammonia one can set up a small column still and use gas house liquor; such impurities as ammonium sulfid and ammonium carbonate not interfering with oxidation in my system. One does not even need to take precautions for drying the ammonia gas coming from such a still working on gas house liquor, because of the extreme flexibility permitted by my use of electrical control and the resistance of my form of platinum catalyzer to the action of such impurities as sulfur and carbon dioxid. Naturally other sources of ammonia might be used, and I have merely given this use of gas house liquor and a column still as one example without desiring to limit myself to this method of producing the nitrose gases. A uniform supply of ammonia can be assured by sending the ammonia gas into a gasometer floating on oil, such gasometer also permitting of sudden increase of ammonia supply in case there is a heavy demand for nitrose gases on the plant.

After passing the mixture of ammonia and air through the oxidation chamber, disclosed in my said applications above, it is introduced immediately into the sulfuric acid system. It can be introduced in the base of a Gay-Lussac tower, together with a small amount of $SO_2$ from the pyrite burners, or it may preferably be introduced in the flue leading from the Glover tower to the chamber or tower system. It is merely necessary to observe that these nitrose gases be introduced into the system where there is a large excess of $SO_2$ gas, so that substantially no $HNO_3$ can form and corrode the lead chambers, etc. It is, of course, self-evident that these nitrose gases cannot be introduced under the grates of the burners because they would be decomposed in passing through the burning pyrites or sulfur.

It will now be clear that instead of introducing nitric acid into the system as above disclosed, this invention employing relatively highly concentrated nitrose gases enables me to introduce said gases, or oxids of nitrogen at any point, into the system where the sulfur dioxid gas is in a large excess; and it further enables me to avoid the difficulties due to dilution of said sulfurous gases that have been heretofore met with in connection with nitrose gases made by the other processes. It will further be clear that these gases will consist of the oxids of nitrogen mixed with air, carrying an excess of nitrogen due to some of the oxygen having been removed.

It is obvious that those skilled in the art may vary the details of my process without departing from the spirit of the invention and therefore, I do not wish to be limited to the above disclosure except as may be required by the claim.

What I claim is:—

The process of manufacturing sulfuric acid which consists in suitably producing sulfur dioxid in a furnace; making a mixture of ammonia and air and producing a concentration above six per cent. of nitrose gases in said mixture; and feeding said concentrated nitrose gases to said sulfur dioxid in excess; substantially as described.

In testimony whereof I affix my signature in presence of two witnesses.

WALTER S. LANDIS.

Witnesses:
S. WARREN MAYS,
GEORGE A. HENDRIE.